May 3, 1932.  W. A. FREDERICK  1,856,246

SLEEVE VALVE ACTUATING MECHANISM

Original Filed March 14, 1927

INVENTOR.
WALTER A. FREDERICK
BY W. W. Harris
ATTORNEY.

Patented May 3, 1932

1,856,246

UNITED STATES PATENT OFFICE

WALTER A. FREDERICK, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE ACTUATING MECHANISM

Original application filed March 14, 1927, Serial No. 175,333. Divided and this application filed December 6, 1928. Serial No. 324,205.

This invention relates to internal combustion engines and refers more particularly to an improved drive mechanism for sleeve valves, being a division of my copending application Serial Number 175,333 filed March 14, 1927.

My present invention provides a novel ball and socket structure for mounting one end of a sleeve driving link on the crank of the valve-shaft.

It is an object of my invention to provide a structure capable of cheap manufacture and convenient assembly, being especially adapted in connection with sleeve valve engines of the "Burt-McCollum" type in which a single sleeve valve for each cylinder has a combined reciprocating and oscillating movement.

Heretofore in engines of the aforesaid type employing a link drive it has been customary to slidably mount one end of the link on the valveshaft crank, the sliding axially of the crank permitting the oscillatory component of the driven sleeve. An object of my invention is to provide a ball and socket connection between the link and valveshaft crank permitting swinging of the link so as to avoid the sliding action with resulting binding tendencies, more particularly to provide an improved ball and socket structure facilitating manufacture and assembly of the sleeve driving mechanism.

Further objects of my invention reside in the provision of improved engine mechanism more particularly hereinafter described and claimed.

Figure 1:
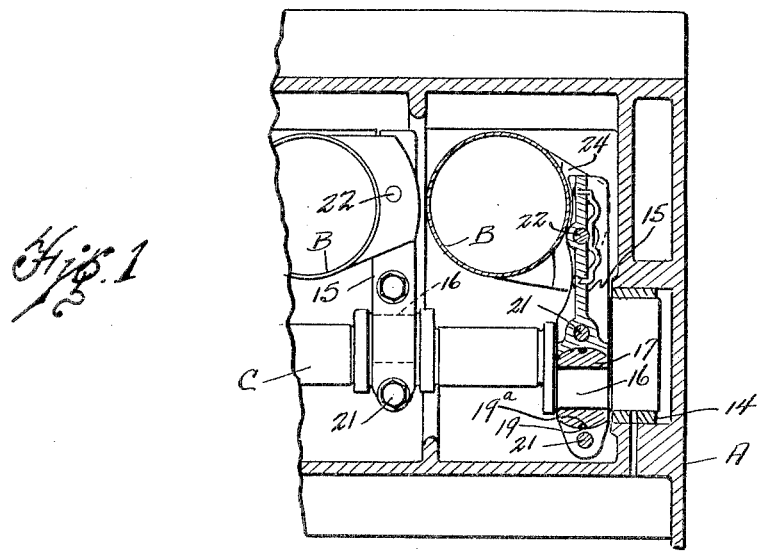
Figure 2:
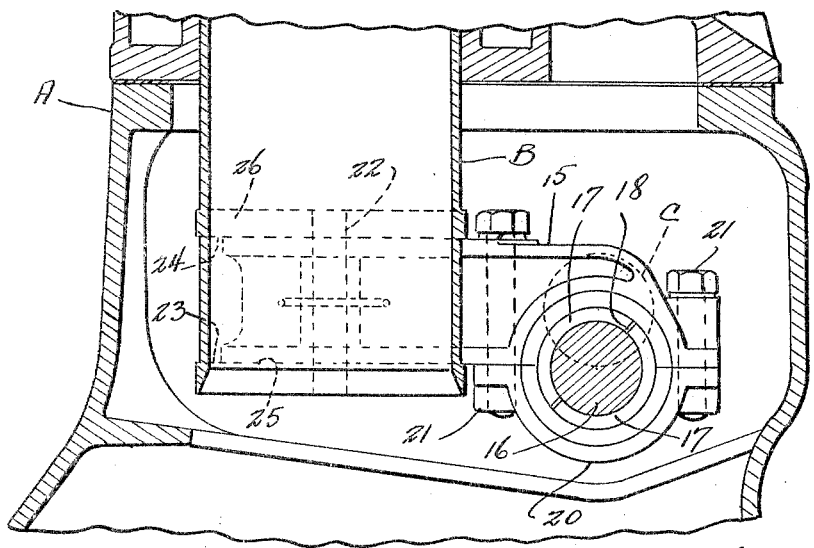
Figure 3:
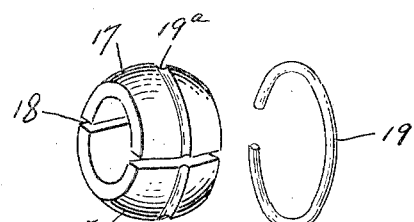

Referring to the accompanying drawings illustrating one embodiment of my invention, Fig. 1 represents a sectional plan view of a portion of an engine showing my improved sleeve driving mechanism, Fig. 2 is a sectional elevation view through one of the engine cylinders, and Fig. 3 is a perspective view showing the crank ball and circlip.

In the drawings reference character A represents the engine having one or more cylinders each provided with the usual ports (not shown) cooperating in the well known manner with the ports (not shown) of sleeve valve B preferably located within the cylinder as shown in Fig. 2. The particular arrangement of cylinder and porting per se forms no part of my invention.

It is customary and desirable in the single sleeve valve engine of the type referrd to, to operate the sleeve with a combined reciprocating and oscillating movement whereby a point on the sleeve will move in a closed path with respect to the cylinder. To this end I have provided a valve layshaft C rotatably mounted in bearings 14 in a position parallel with the engine crankshaft (for a multi-cylinder engine), the layshaft being suitably driven at the usual half engine speed for a four stroke cycle engine.

For driving the sleeves from the layshaft the latter is provided with spaced cranks 16, having mounted thereon the complementary spherical bearing portions 17 split at 18 for convenience of manufacture and assembly. The split portions of the bearings may if desired, be held in position during assembly by any means such as the resilient circlips 19 engageable in circumferential grooves 19$^a$. Surrounding each bearing 17 is an end of a driving link 15, this end having a bearing cap 20 secured to the complementary main bearing portion of link 15, as by threaded bolts 21. For strength and reduction in weight the links 15 may be I-shaped in cross section. The inner ends of the links are pivotally secured by a pivot pin 22 between the inner bearing faces 23 and 24 of the sleeve actuating projections 25 and 26. Instead of forking the sleeve projections to receive the actuating link, I may fork the actuating link to receive an actuating projection therebetween as will be readily understood. The links 15 thus have a combined motion consisting of movement axially of the sleeve in parallel planes and movement transversely of the layshaft. With my invention it is possible to provide a rigid link, the point of connection to the layshaft serving the double purpose of actuating the link and also permitting universal movement of the link end to compensate for the arcuate path of travel of the point 22 as the latter oscillates about the sleeve axis.

Various changes and modifications may be resorted to without departing from the spirit or scope of my invention as shown, described, and claimed.

What I claim as my invention is:

1. In a device of the character described for operating sleeve valve means and having a driving shaft provided with a crank and a driven link associated therewith; driving connections between said link and driving shaft including complementary spherical bearing members surrounding the crank and immovable axially thereof, said link having a spherical socket segment adapted to receive a portion of the spherical bearing, a complementary segmental bearing cap adapted to receive a second portion of the spherical bearing, means securing the cap to the link so as to form with the said spherical socket segment a spherical socket substantially enclosing the spherical bearing and permitting universal movement of the link relative to said crank, said spherical bearing members being provided with a groove, and means releasably engaging said groove for holding said bearing members together.

2. In a device of the character described for operating sleeve valve means and having a driving shaft provided with a crank and a driven link associated therewith; driving connections between said link and driving shaft including complementary spherical bearing members surrounding the crank and immovable axially thereof, said link having a spherical socket segment adapted to receive a portion of the spherical bearing, a complementary segmental bearing cap adapted to receive a second portion of the spherical bearing, means securing the cap to the link so as to form with the said spherical socket segment a spherical socket substantially enclosing the spherical bearing and permitting universal movement of the link relative to said crank, said spherical bearing members being provided with a circumferential groove, and a resilient circlip releasably engaging said groove for holding the spherical bearing portions together.

3. In a device of the character described for operating sleeve valve means and having a driving shaft provided with a crank and a driven link associated therewith; driving connections between said link and driving shaft including complementary spherical bearing members surrounding the crank and immovable axially thereof, said link having a spherical socket segment adapted to receive a portion of the spherical bearing, a complementary segmental bearing cap adapted to receive a second portion of the spherical bearing, means securing the cap to the link so as to form with the said spherical socket segment a spherical socket substantially enclosing the spherical bearing and permitting universal movement of the link relative to said crank, said spherical bearing members being provided with a circumferential groove, and a resilient circlip releasably engaging in said groove for holding the spherical bearing portions together, said circlip seated entirely within said groove within the limits as defined by the outside diameter of the assembled spherical bearing members.

In witness whereof, I hereunto subscribe my name this 26th day of November, A. D. 1928.

WALTER A. FREDERICK.